United States Patent
Inserra Imparato et al.

(10) Patent No.: US 9,962,917 B2
(45) Date of Patent: May 8, 2018

(54) METHOD OF MANUFACTURING SINGLE PIECE FUSELAGE BARRELS IN COMPOSITE MATERIAL

(71) Applicant: ALENIA AERMACCHI S.p.A., Rome (IT)

(72) Inventors: Sabato Inserra Imparato, Naples (IT); Pietrantonio Cerreta, Naples (IT)

(73) Assignee: ALENIA AERMACCHI S.p.A., Roma (IT)

( * ) Notice: Subject to any disclaimer, the term of this patent is extended or adjusted under 35 U.S.C. 154(b) by 656 days.

(21) Appl. No.: 14/394,005

(22) PCT Filed: Apr. 12, 2013

(86) PCT No.: PCT/IB2013/052928
§ 371 (c)(1),
(2) Date: Oct. 10, 2014

(87) PCT Pub. No.: WO2013/153537
PCT Pub. Date: Oct. 17, 2013

(65) Prior Publication Data
US 2015/0122413 A1 May 7, 2015

(30) Foreign Application Priority Data
Apr. 12, 2012 (IT) .............................. TO2012A0317

(51) Int. Cl.
*B32B 37/10* (2006.01)
*B29C 70/32* (2006.01)
(Continued)

(52) U.S. Cl.
CPC ........ *B32B 37/1018* (2013.01); *B29C 33/485* (2013.01); *B29C 70/32* (2013.01);
(Continued)

(58) Field of Classification Search
CPC ..... B29C 33/485; B29C 70/32; B29C 70/446; B32B 37/1018; B32B 37/10; B64F 5/10
See application file for complete search history.

(56) References Cited

U.S. PATENT DOCUMENTS

2009/0139641 A1 6/2009 Chapman et al.
2010/0276069 A1 11/2010 Lengsfeld et al.
(Continued)

FOREIGN PATENT DOCUMENTS

DE   10 2007 027113 A1   12/2008
DE   10 2007 060029 A1    6/2009
(Continued)

OTHER PUBLICATIONS

International Search Report for corresponding International Patent Application No. PCT/IB2013/052928 dated Sep. 30, 2013.

*Primary Examiner* — Christopher Schatz
(74) *Attorney, Agent, or Firm* — Merchant & Gould P.C.

(57) ABSTRACT

A vacuum bag (18) is placed around the inner forming surface (IML) of an inner mandrel with radially retractable sectors (11a, 11b) having parallel longitudinal slots (17) with composite stringers (30) in the slots (17). An inner support (31) in each stringer is covered by an impermeable tubular bag (32). A composite skin (37) is laminated around the stringers (30), the coated supports (31, 32) and the inner forming surface (IML). An outer curing tool (50, 51) closes around the skin (37) defining an fuselage barrel outer forming surface (OML), leaving an annular gap (G) between the skin outer surface (37) and the outer forming surface (OML). Vacuum is applied between the vacuum bag (18) and the outer tool (50, 51), enlarges the uncured barrel diameter, releasing the barrel from the inner mandrel (10) and bringing the skin outer surface (37) into contact with the outer tool inner surface (IML).

15 Claims, 6 Drawing Sheets

(51) Int. Cl.
*B29C 70/44* (2006.01)
*B29C 33/48* (2006.01)
*B64C 1/06* (2006.01)
*B32B 37/00* (2006.01)
*B64F 5/10* (2017.01)
*B64F 5/50* (2017.01)
*B29L 31/30* (2006.01)
*B64C 1/00* (2006.01)

(52) U.S. Cl.
CPC ........ *B29C 70/446* (2013.01); *B32B 37/0046* (2013.01); *B64C 1/068* (2013.01); *B64F 5/10* (2017.01); *B64F 5/50* (2017.01); *B29L 2031/3082* (2013.01); *B32B 2309/68* (2013.01); *B32B 2605/18* (2013.01); *B64C 2001/0072* (2013.01); *Y02T 50/433* (2013.01)

(56) References Cited

U.S. PATENT DOCUMENTS

| | | | |
|---|---|---|---|
| 2012/0055617 | A1 | 3/2012 | Van Vuegt et al. |
| 2013/0000815 | A1 | 1/2013 | Barlay et al. |

FOREIGN PATENT DOCUMENTS

| | | |
|---|---|---|
| DE | 10 2009 056978 A1 | 9/2011 |
| WO | WO 00/61464 A1 | 10/2000 |
| WO | WO 2005/018917 A2 | 3/2005 |
| WO | WO 2005/018918 A1 | 3/2005 |
| WO | WO 2005/082604 A2 | 9/2005 |
| WO | 2007/148301 A2 | 12/2007 |

METHOD OF MANUFACTURING SINGLE PIECE FUSELAGE BARRELS IN COMPOSITE MATERIAL

This application is a National Stage Application of PCT/IB2013/052928, filed 12 Apr. 2013, which claims benefit of Serial No. TO2012A000317, filed 12 Apr. 2012 in Italy and which applications are incorporated herein by reference. To the extent appropriate, a claim of priority is made to each of the above disclosed applications.

BACKGROUND OF THE INVENTION

The present invention refers to a method of manufacturing fuselage barrels in composite material stiffened by stringers. More particularly, the invention refers to the manufacturing of fuselage barrels made in a single piece in composite material, including a skin of overall tubular, cylindrical or truncated conical shape, and a series of longitudinal stringers which protrude on the inner surface of the barrel.

The state of the art includes various methods for manufacturing complete fuselage barrels in composite. In general, some methods require curing the barrel around an inner mandrel or inner forming tool, which provides the inner forming surface for the barrel (the so-called "inner mould line" (IML) or "inner mould surface"). In other cases, curing takes place in a hollow forming tool which provides the outer forming surface for the barrel ("outer mould line" (OML) or "outer mould surface").

A first known method includes laminating the barrel and its subsequent curing over a mandrel having a shape corresponding to the inner surface ("inner mould line") of the fuselage barrel. According to this technique, the not yet cured stringers are accommodated in corresponding longitudinal slots formed in the outer surface of the mandrel. An inflatable element (or "bladder") is positioned inside each stringer, and then a layer of fabric pre-impregnated with thermosetting curable resin is laid over the stringers in order to retain the stringers and the inflatable elements during the subsequent rotation stage. The outer skin is then laid down using the known art of fibre placement. Flexible sheets of metal or carbon (so-called "caul plates") are then positioned over the assembly, their function being to smooth the outer surface of the barrel during curing in the autoclave. Finally, the entire assembly is covered by a vacuum bag made by a known technique using a nylon film, after preparing pathways for extracting the air and the gases (breather fabric and vacuum valves). The whole assembly is then positioned in an autoclave for the process of curing/compaction by means of heat and temperature.

This method has the advantage of ensuring a precise inner surface which simplifies the assembly of the inner structural elements (spar frames etc.) but potentially entails some drawbacks:

In order that it can be extracted from the barrel after curing, the mandrel, which has the shape of the IML, is dismantlable into a multiplicity of collapsible sectors (typically six sectors). This requirement implies the presence of sealing gaskets between the sectors which, as they have to resist the temperature and pressure of the autoclave, must be maintained frequently to avoid the risk of sealing losses with consequent unacceptable porosity on the barrel produced.

Breaking down the mandrel into radially retractable sectors requires operating mechanisms. The latter are negatively affected by the temperature and pressure of the autoclave, and for this reason they, too, are subject to frequent maintenance operations.

The sectors of the mandrel must be accurately coupled in order to prevent the formation of unacceptable steps and wrinkles on the barrel. For large-sized fuselage barrels, accurate coupling of the sectors is very complex and requires frequent adjustments.

A compaction mechanism thrusts the outer surface of the barrel against the IML surface of the shaping mandrel, reducing the circumferential length of the uncured material to bring it to the cured thickness. The action of the compaction mechanism, combined with the reduction in the circumferential length, creates longitudinal wrinkles on the outer surface of the barrel which must be characterized by a complex and expensive plan of structural tests to verify acceptability.

Another known method is used to produce fuselage barrels of small diameter, with a sandwich structure and a honeycomb stiffening. In this method, an auxiliary mandrel is used, of a shape corresponding to the inner shape of the barrel (IML), on which a nylon film is arranged which will constitute the final vacuum bag. The inner skin is then laid down by means of the known art of fibre placement. Subsequently, the said "honeycomb" material is positioned and the outer skin of carbon-reinforced resin is then laid down, again using fibre placement technique. At this point a curing tool with a surface equal to the outer surface of the barrel (outer mould line, OML) is positioned around the barrel. The vacuum bag, already set up on the IML auxiliary mandrel, is sealed including to the OML outer cure tool. When the vacuum is applied, the barrel tends to separate from the IML auxiliary mandrel to attach itself to the surface of the OML mandrel. A gap is thus created which makes it possible to remove the IML auxiliary mandrel and to send the barrel in the OML tool into the autoclave for curing/compaction. This method overcomes the problems of the previous method, but is applicable with known methods only to sandwich structures, while the risk remains that extracting the IML mandrel from the barrel before curing, which is performed with a limited gap, could damage the curing bag.

The need is currently felt in the aeronautical industry for manufacturing barrels stiffened by stringers.

US 2009/0139641 A1 provides for the application of the composite material to the inside of a hollow surface, constituting the OML surface, of a hollow mandrel, so as to form a skin which extends for 360° around an axis. The stringers are then positioned on an inner surface of the skin, by means of a positioner which enters the inside of the mandrel OML and thrusts the flanges or wings of the stringers against the skin. A vacuum bag is installed over the stringers and a vacuum is applied to it in order to press the stringers and the skin outwards and against the inner surface of the tool. The assembly of skin and stringers is then co-cured to fix the stringers to the skin and harden the structure. For laminating, a special fibre placement machine is required, capable of laminating inside the OML mandrel, as well as a complex apparatus for positioning the stiffening stringers and the vacuum bag.

SUMMARY OF THE INVENTION

It is an object of the invention is to propose a simplified method for manufacturing complete fuselage barrels stiffened by stringers having a particularly accurate outer surface, which in use is the aerodynamic surface. Other objects of the invention are to avoid damage to the uncured composite material, to the vacuum bag and to the forming tools.

These and other objects and advantages, which will be better understood hereafter, are achieved according to the invention by a manufacturing method.

BRIEF DESCRIPTION OF THE DRAWINGS

Features and advantages of the invention will become clear from the detailed description which follows, provided purely by way of non-limiting example with reference to the attached drawings, in which.

DETAILED DESCRIPTION OF THE PREFERRED EMBODIMENT

Figure 1:
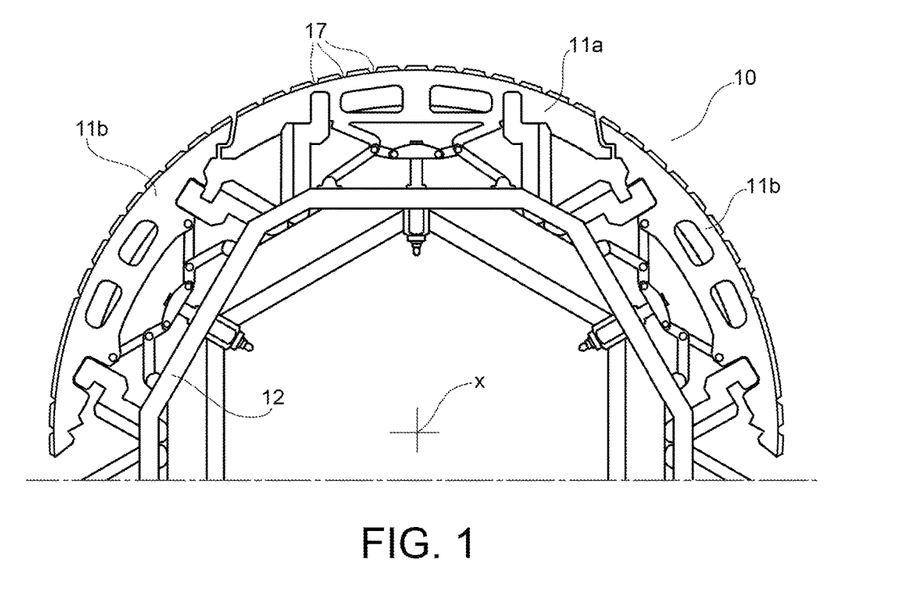
FIG. 1 is a schematic partial view, in vertical section, of a mandrel with retractable sectors.
Figure 2:
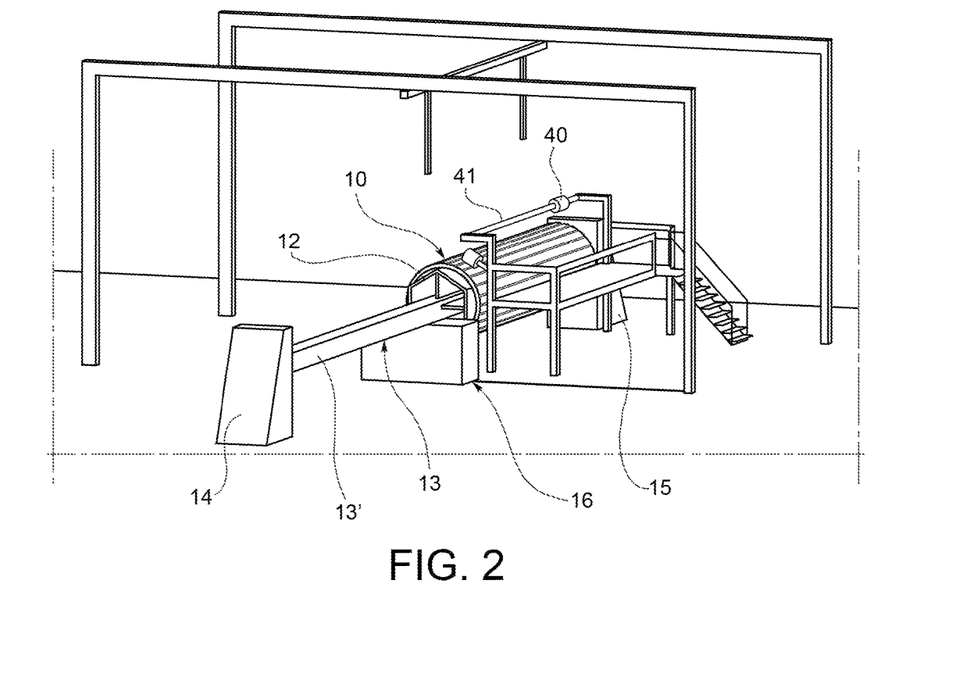
FIG. 2 is a schematic perspective view of a plant for forming fuselage barrels in non-cured composite material, stiffened by stringers.

Referring initially to FIGS. 1 and 2, numeral 10 designated as a whole a collapsible inner mandrel (or auxiliary mandrel), the outer surface of which is defined by a set of mandrel sectors 11, radially retractable with respect to a central horizontal axis x. The mandrel sectors are operable in radial directions so as to assume a radially extended position in which they are located circumferentially side by side so as to define together a circumferentially continuous outer surface on which are deposited the pre-impregnated strips of fibre to be cured for manufacturing the fuselage body. In the example illustrated in the drawings, the outer surface of the mandrel is almost cylindrical for manufacturing a body or median section of the fuselage of an aircraft; however, the present method is equally applicable to making tapered fuselage barrels (or bodies), for example of truncated conical shape, according to the longitudinal position which the barrel is intended to occupy along the fuselage. The method is not limited to manufacturing barrels having shapes of solids of revolution or ruled surfaces.

The mandrel 10 includes a reticular inner support structure 12, in this example shaped as a hexagonal prism, mounted rotatably around the axis x on a central rotating axle 13. In a manner known per se, the sectors of the mandrel are divided into two sets 11a and 11b, arranged alternately in the circumferential direction. An example of an inner mandrel of appropriate type is known, for example, from WO 2007/148301 A2. The rotating axle 13 is supported by three supports: two end supports 14, 15 and an intermediate support 16, preferably arranged at half the distance between the end supports, in such a way that the inner mandrel 10 remains supported in a working position between one of the two end supports (in this example the support 15) and the intermediate support 16, for reasons which will be explained below.

On the outer surface of the sectors 11a, 11b, parallel longitudinal slots 17 are formed (FIG. 4), in this example of trapezium shape, in which are located the longitudinal reinforcing elements 30, called stringers. The stringers 30, as seen in a transversal cross section, have a profile substantially matching the cross-sectional shape of the slots 17, in this example of trapezium shape. When the sectors are in their radially extended position (FIG. 1), the inner mandrel defines the so-called "inner mould line" (IML) or "inner mould surface", i.e. the inner forming surface for the barrel.

Figure 5:
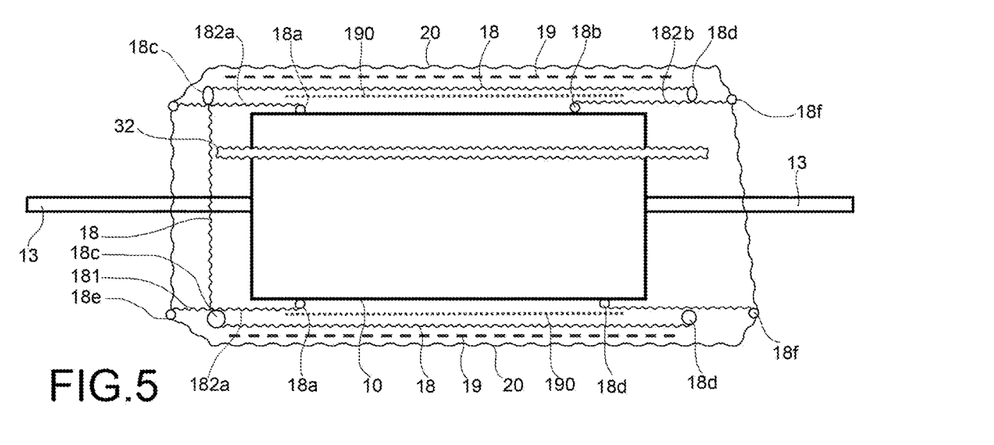
FIG. 5 is a schematic side view of the mandrel of FIG. 1, at a preliminary stage of its preparation before laying down the composite material.

Two annular inner terminal bags 182a, 182b made of nylon for vacuum bag (FIG. 5) can be fitted over the two opposite axial ends of the inner mandrel 10. Each annular inner bag 182a, 182b is sealed to the inner mandrel 10 along a respective circumferential sealing line 18a, 18b in proximity to each of the two opposite axial ends of the outer surface of the mandrel. Subsequently, the surface of the mandrel 10 and part of the annular terminal inner bags 182a, 182b can be covered with a breather fabric 190. Particularly, the breather fabric 190 can be placed on the radially outer part of the surface of the inner mandrel 10 comprised between the first 18a and the second 18b circumferential sealing lines.

A tubular nylon film for vacuum bag 18, herein termed main bag, is then positioned on the inner mandrel 10, preferably having an axial length exceeding that of the inner mandrel 10. The opposite axial ends of the main vacuum bag 18 are sealed along two circumferential sealing lines 18c, 18d on the outer surfaces of the two annular inner terminal bags 182a, 182b, respectively.

Vacuum is then applied so as to make the main vacuum bag 18 adhere to the outer surface of the mandrel 10, taking care to minimize wrinkles, in such a way as to cause the main vacuum bag 18 to copy the shape of the outer surface of the mandrel 10.

A breather fabric 19 (or peel ply or other "breather" material) is then applied to the main vacuum bag 18. Over this a separator layer (FEP or parting film) 20 is applied, prepared in tubular form, for example by longitudinal gluing with adhesive tape suitable for high temperatures (Permacel®) or by longitudinal welding.

The tubular parting film 20 is sealed to the two annular inner terminal bags 182a, 182b along two circumferential sealing lines 18e, 18f, in this example at axially outer ends of the annular inner terminal bags 182a, 182b, in respective positions which are axially outer with respect to the circumferential sealing lines 18a, 18b and 18c, 18d of the main vacuum bag 18.

Figures 3, 4:
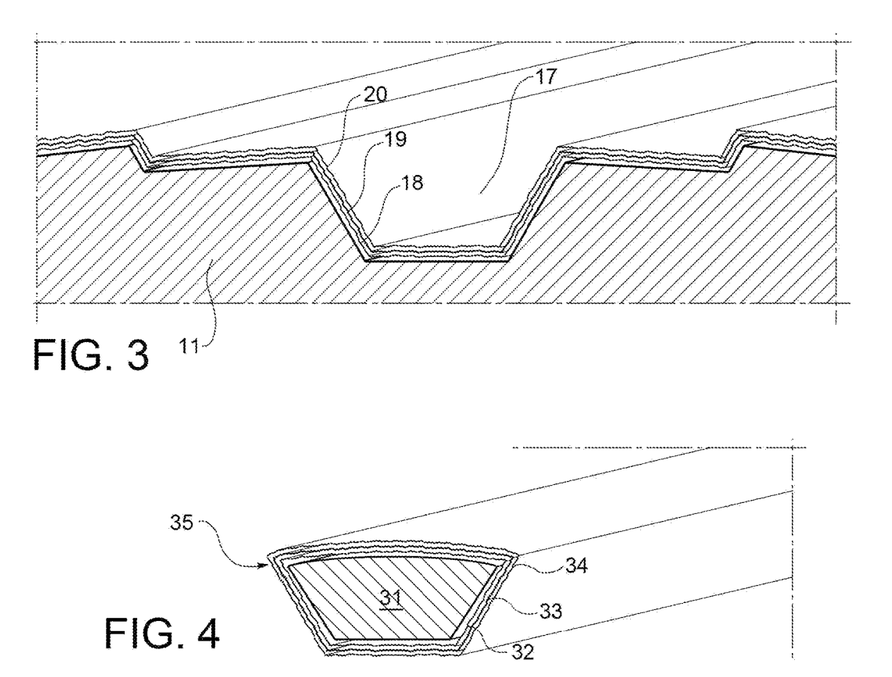
FIG. 3 is a schematic sectioned perspective view of a peripheral part of the mandrel of FIG. 1 at a preliminary stage of the manufacturing process.
FIG. 4 is a sectioned schematic perspective view of a covered support for forming the stringers.

The method continues with placing the stringers 30 one after the other in the peripheral slots 17 of the mandrel, while the latter is rotated to present to the operator the next cavity into which to deposit the stringer. For each stringer, an inflatable element 35 illustrated on FIG. 4 is prepared in advance. An inner support or "plug" 31 is provided for each stringer, elongated in a direction here defined as longitudinal, having a transverse cross section of a shape corresponding to that of the stringer, in this example of trapezium shape. The inner support 31 can be of any material resistant to the curing temperature and can be full (for example with rubber or foam) or hollow, with the requirement that it should not be crushed when vacuum is applied during preparation of the support. The support 31 is wrapped in a series of layers, the first of which is an impermeable tubular film bag 32, preferably of nylon, which is neatly closed around the inner support 31.

The length of the tubular bag 32 is preferably greater than that of the support by at least 50 mm per side. This excess material will be folded back at the two ends and held in position by adhesive tape. The tubular bag 32 should cover and remain adhering to the support 31.

A layer of thin breather 33 (Peel Ply), preferably of polyester or glass fibre, is then applied around the tubular bag 32. A tubular separator film 34, preferably made of FEP, is applied around the breather layer or bag 33. The tubular film 34 can be sealed at its two ends with adhesive tape suitable for high temperatures. Vacuum is applied, for example by means of a tube with a rapid closure valve (not illustrated), making the tubular bag 32 and the other layers of tubular film material adhere to the support 31, thereby minimizing wrinkles.

The supports 31 covered by the tubular bags 32 (and the other layers mentioned) provide inflatable elements which are each positioned in a respective slot 17 of the inner mandrel 10.

Figure 15:
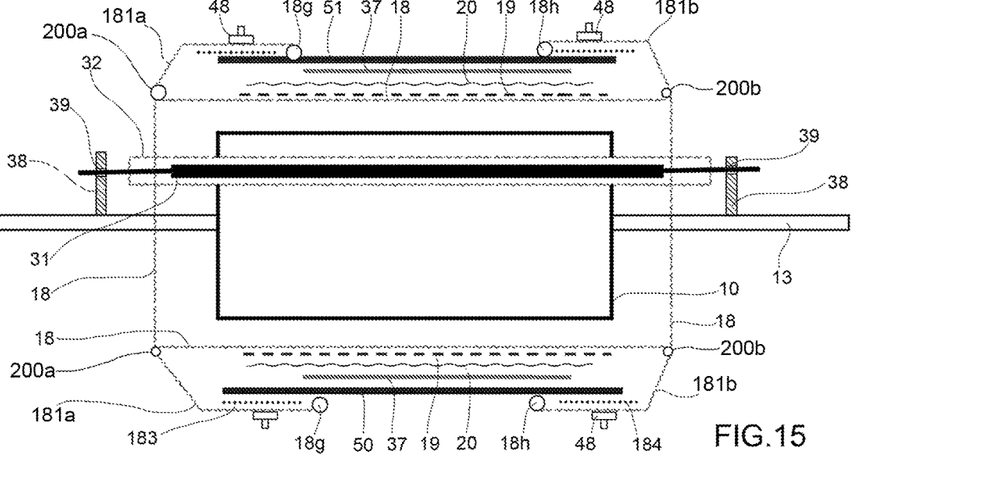
FIG. 15 is a schematic side view of the mandrel, the barrel, the outer mould and film wrappers that may be used in the method.

At first, the inflatable elements 35 are located in the upwards-facing cavities of the stringers 30. Then, on top of the inflatable elements 35, a ply of uncured pre-impregnated tissue of fiber-reinforced curable thermosetting material, can be laid, for example manually. A pre-vacuum bag (not illustrated) can be placed. In this way, as the subsequent rotation of the mandrel proceeds, the inflatable elements do not fall out of the slots. Alternatively or in addition, to retain the inflatable elements 35 temporarily in position in the stringers, a respective radial prop 38 (FIG. 15) can be arranged, at both ends of the inner mandrel 10, capable of supporting one of the two ends of each inner support 31. Preferably the radial props 38 are secured for rotation with the inner mandrel 10 around the axis of rotation x. In this example, each end of an inner support 31 is accommodated in an aperture 39 provided by the respective radial prop 38. FIG. 15 schematically illustrates only the radial props 38 for one of the inflatable elements 35. According to one embodiment, the radial props 38 for all the inflatable elements 35 of the barrel can be made from two elements in the form of a wheel, each arranged at one end of the inner mandrel, and each having a plurality of apertures 39 for accommodating respective ends of the inner supports 31. According to a possible embodiment, the apertures 39 can be made in the form of radially elongated slots to allow limited movements in a radial direction, but not in a circumferential direction, of the inflatable elements 35.

Figure 13:
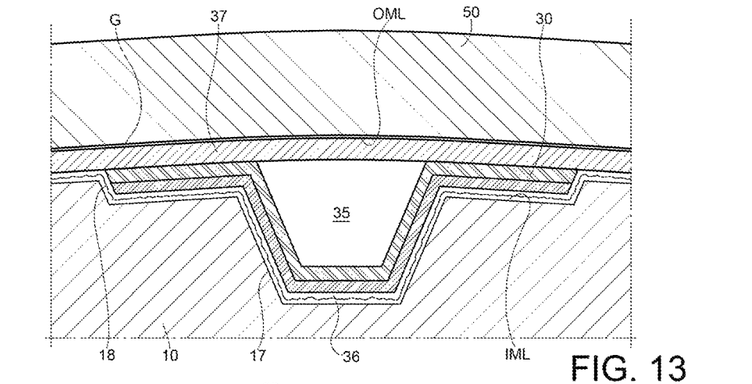
FIG. 13 is a schematic partial view, in vertical section, of a tract of barrel comprised between an outer mould and the inner mandrel of the forming apparatus.

The stringers that are placed can be either pre-cured stringers or fresh (not yet cured). In the case of fresh stringers, as schematically illustrated in FIG. 13, a shape element (caul plate 36) may be arranged between the inflatable element 35 and the uncured stringer to give shape to the stringer.

After the positioning of the inflatable elements is completed, the pre-vacuum bag (not illustrated) is removed and the stratification of the plies of the skin is performed according to automatic or assisted manual processes.

In the automated process, the mandrel can be rotated around the axis x by means of an operating mechanism (not illustrated), while the heads of the above machine are simultaneously operated so that the machine deposits the pre-impregnated fibre tape material around the mandrel. In this phase, strips of fibre pre-impregnated with resin, such as carbon fibres with epoxy resins and graphite with bismaleimide resin can be laid automatically by means of one or more delivery heads of a laying machine (fibre placement machine). The delivery heads of the machine and the mandrel can be moved relative to each other in such a way that the heads apply the tape onto the mandrel following a relative movement of translation and rotation with respect to the axis of the mandrel. Machines for automated laying of composite tapes are known, for example, from patent publications WO 2005/082604 A2, WO 2005/018918 A1 and WO 2005/018917 A2.

In the manual process, the pre-impregnated tapes can be unrolled from rolls 40 (FIG. 2) mounted for example on a bar 41 arranged parallel to the axis of the mandrel. Depending on the specific needs, the tapes can be applied at angles of 0°, 45° or 90°, as is known to experts in the field. In this way the "skin" 37 of the fuselage barrel or body in composite laminate is formed on the outer surface of the inner mandrel.

When the lamination of the skin is completed, an outer polymerization (or "curing") tool is mounted around the inner mandrel 10, defining a cavity which has a surface suitable for forming the so-called outer mould line (OML), i.e. the radially outermost surface of the fuselage barrel. The OML outer tool is made up of the union of two complementary or explementary half-moulds, one 50 lower and one 51 upper, each defining one half, respectively upper and lower, of the OML surface. The two coupled half-moulds 50, 51 completely surround the skin 37 through an angle of 360°.

The axle of rotation 13 has a length 13' which in the lamination phase extends to the outside of the structure of the mandrel 10; preferably the outer length 13' has a length corresponding or comparable to the end of the mandrel.

Figure 6:
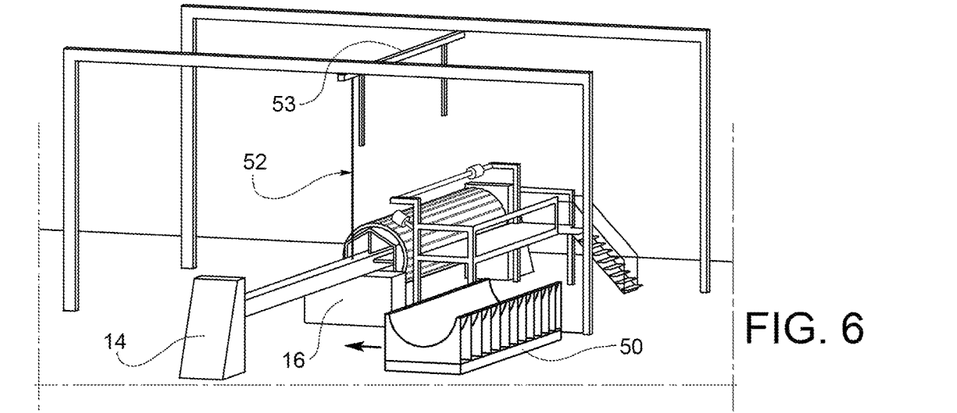
FIGS. 6 to 12 are schematic perspective views which illustrate the plant of FIG. 2 during various stages of preparing the barrel which is to be cured.
Figure 7:
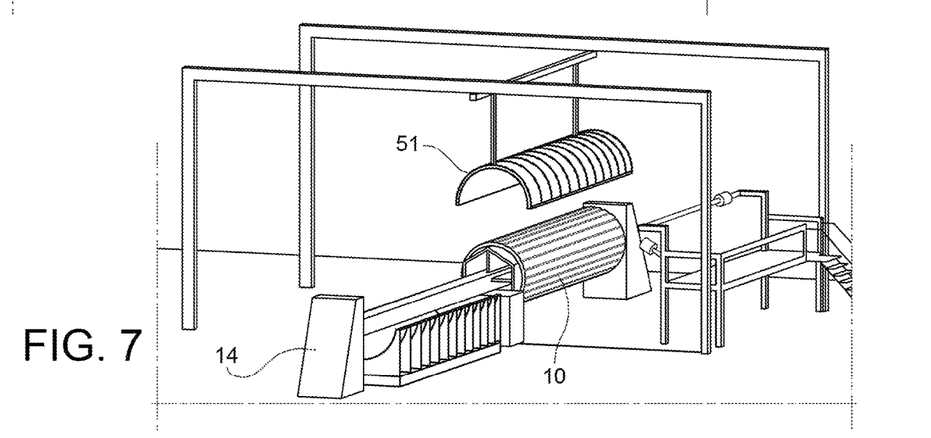
Figure 8:
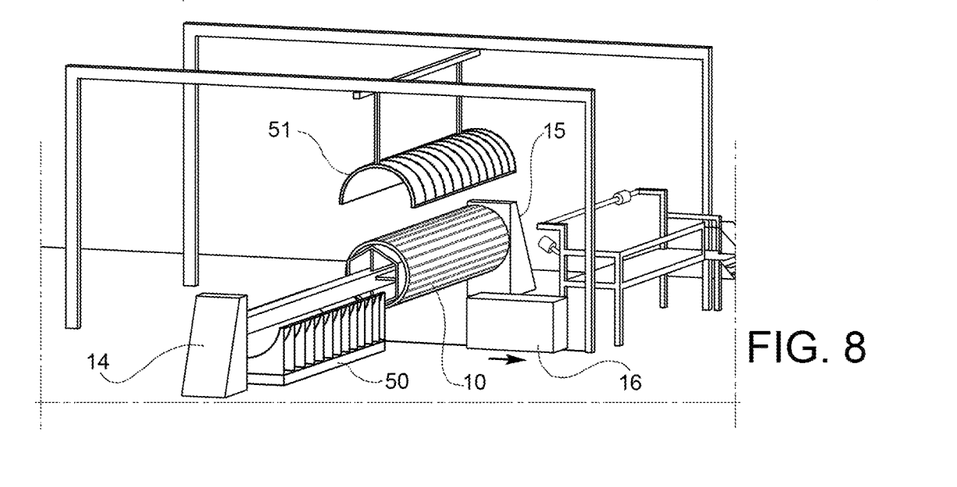

First (FIGS. 6-8) the lower outer half-mould 50 is placed under the mandrel 10 on which the not yet cured barrel is located. The axle 13 is suspended at an intermediate point along its length from a gantry 53 (FIG. 6), for example by means of a suspended hook 52. Then (FIG. 7) the lower half-mould 50 is placed under the outer length 13' of the axle, in line with the axis of the mandrel. The intermediate support 16 is then removed (FIG. 8) and the lower half-mould 50 is slid longitudinally, with its part of OML surface having the concavity facing upwards, bringing it under the mandrel 10 and facing towards the barrel to be cured, without touching it.

Figure 9:
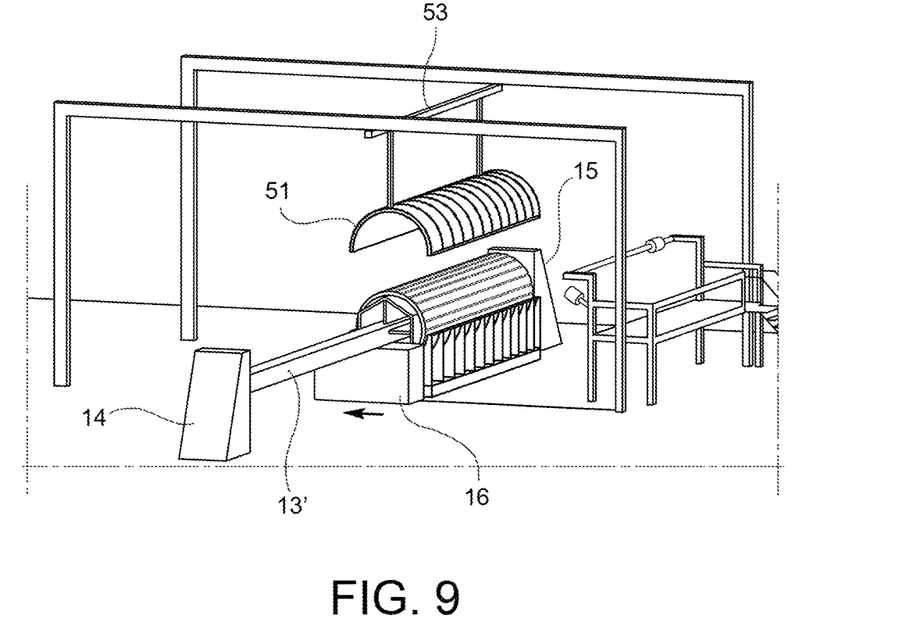

Subsequently (FIG. 9), the intermediate support 16 of the rotation axle 16 is repositioned and the suspension hook 52 for the said axle is removed.

Figure 10:
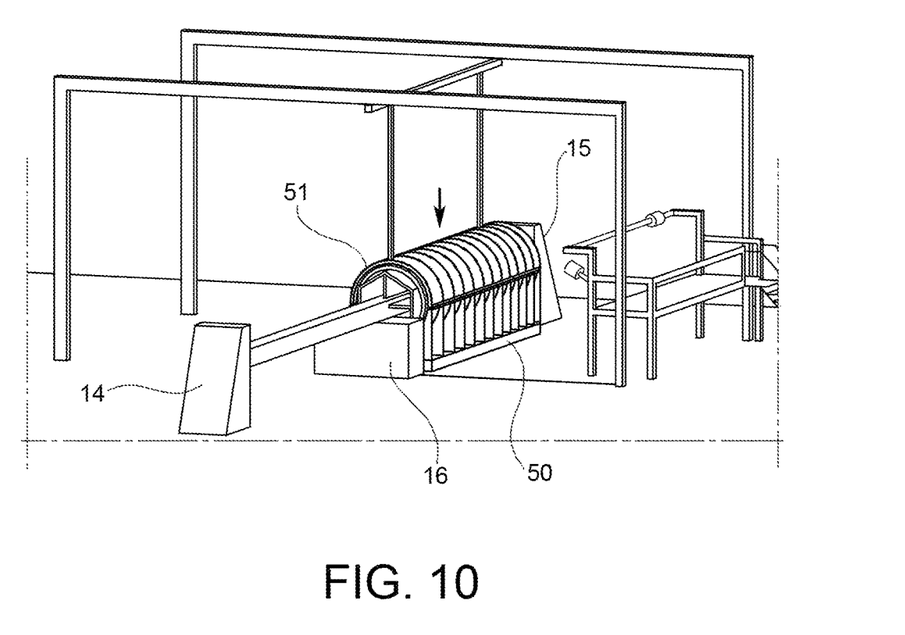

The upper half-mould 51, suspended from the gantry 53 with its own concave part of OML surface facing downwards, is placed on the lower half-mould 50 and accurately coupled to the latter, so as to surround the not yet cured barrel without touching it (FIG. 10). As schematically shown in FIG. 13, the mutually facing OML surfaces of the upper 51 and lower 50 half-moulds are dimensioned in such a way that between the OML surface of the tool and the outer surface of the skin 37 of the not yet cured barrel there should be, at this stage, a radial play or annular gap G, preferably of approximately 2-4 mm (FIG. 13).

The upper 51 and lower 50 half-moulds are then mechanically joined, for example using bolts; the joints between the half-moulds are sealed, preferably with strips of nylon film (not illustrated).

Subsequently, the opposite ends are opened of the tubular bags 32 arranged around each of the inflatable elements.

Figure 14:
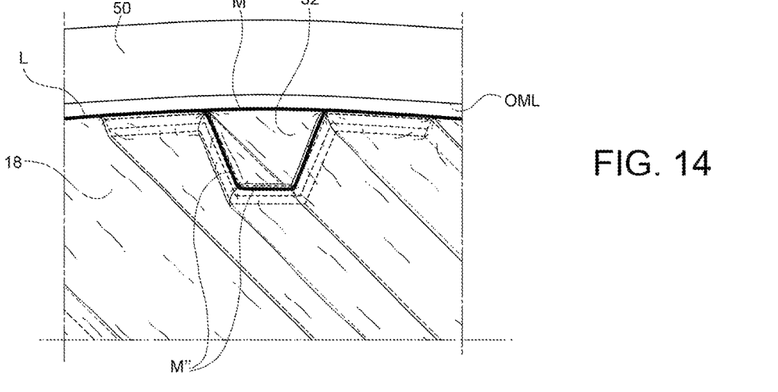
FIG. 14 schematically indicates the sealing lines between parts of the forming apparatus and various impermeable film wrappers used in the method.

The main vacuum bag 18 must then be sealed, it having previously been arranged on the IML inner mandrel 10, to the circular edges at the two opposite axial ends of the OML tool, except in the region of the stringers 30 (FIGS. 14 and 15).

In FIG. 14, L indicates two sealing segments of the bag 18 with the OML outer tool 50 (or 51, depending on the angular position considered). The sealing segments L extend over the perimeter lengths between two consecutive slots 17 of the mandrel 10. The said main vacuum bag 18 is sealed also with the strips of bag (not illustrated) arranged at the joints between the lower half-mould 50 and the upper half-mould 51 of the OML outer tool. The two apertures or ports at the opposite ends of each tubular bag 32 are continuously sealed, along sealing lines forming a closed loop (FIG. 14), to the OML outer tool and to the main vacuum bag 18. These sealing lines include an outer length M' forming a seal with the surface of the corresponding OML outer tool, 50 or 51, and a length M" forming a seal to the main vacuum bag 18 which encloses the inner mandrel 10.

FIG. 15 schematically shows the connection of the main vacuum bag 18 with the OML outer tool 50, 51. The main vacuum bag 18 is disconnected from the annular inner terminal bags 182a, 182b and is connected to two other annular outer terminal bags 181a, 181b suitably arranged on the OML outer tool 50, 51, by means of two respective circumferential sealing lines 200a and 200b.

Vacuum is applied through one or more valves 48, connected in this example to the annular outer terminal bags 181a, 181b, to the volume enclosed between the main vacuum bag 18 and the OML outer tool 50, 51. Layers of breather 183, 184 can be arranged between the annular outer terminal bags 181a, 181b and the outer tool 50, 51.

The depression in the space comprised between the main vacuum bag 18 and the OML outer tool 50, 51 generates direct forces in radially outer directions which are effective for enlarging the diameter of the uncured barrel, making it adhere to the inner surface of the OML tool and separating it from the inner mandrel 10.

According to methods known per se, the sectors 11 of the inner mandrel can be withdrawn, i.e. radially retracted, until the sectors are radially spaced 10-15 cm away from the IML surface of the uncured barrel. The intermediate support 16 of the axle of rotation of the IML mandrel can then be removed. Without the intermediate support, the inner mandrel 10 inevitably deflects downwards. The gap or radial play G mentioned above, between the barrel and the OML surface of the outer tool 50, 51, should ensure that there is no interference between the surface of the radially retracted inner mandrel 10 and the IML surface of the uncured barrel.

Figure 11:
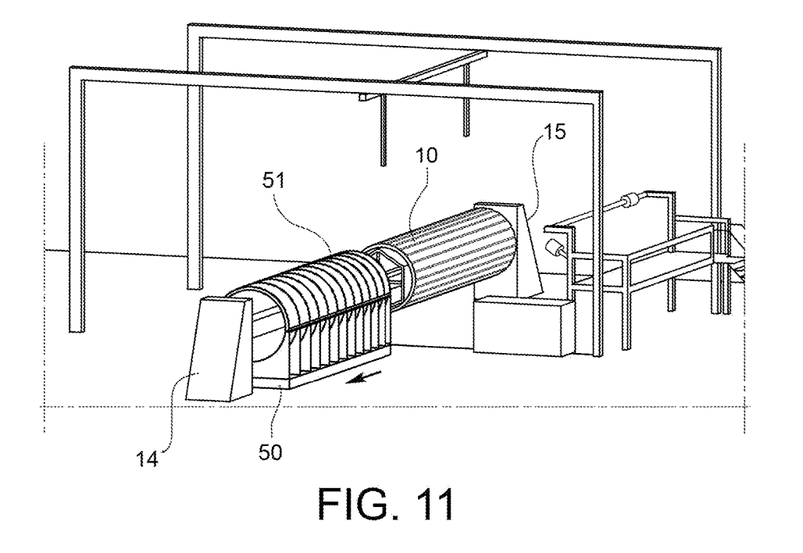
Figure 12:
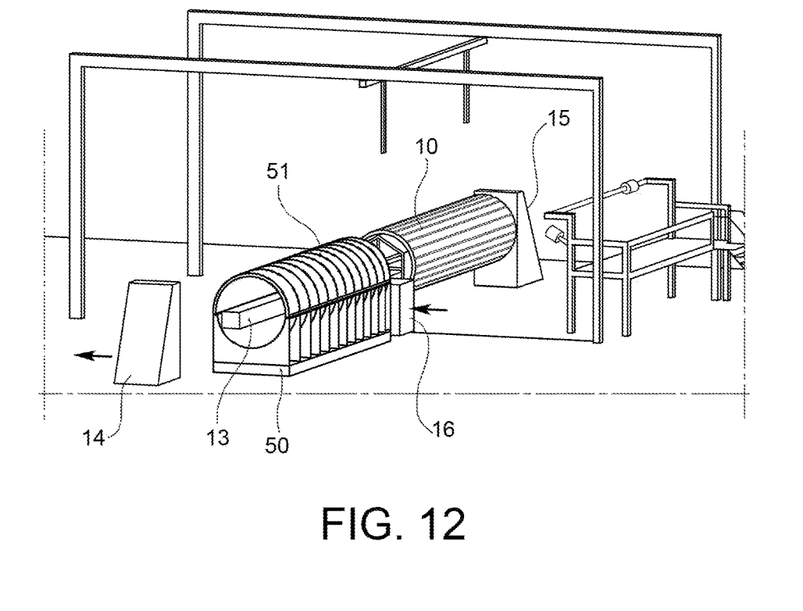

Subsequently (FIG. 11), the outer tool 50, 51 can be moved, by translating it longitudinally, parallel to the axis of rotation, moving it away from the inner mandrel 10. After this, the intermediate support 16 for the rotation axle can be refitted, and then the (non-motorized) end support 14 for the rotation axle can be removed (FIG. 12), so as to allow a complete longitudinal extraction of the OML tool from the rotation axle. Finally the outer tool 50, 51, containing the barrel to be cured, is transferred to the autoclave.

Various aspects and forms of embodiment of the method have been described. It is to be understood that each embodiment can be combined with any other embodiment described and/or illustrated. The invention, furthermore, is not limited to the embodiments described, but may be varied within the scope defined by the appended claims.

The invention claimed is:

1. A method of manufacturing a fuselage barrel made from a single piece of composite material, the barrel comprising a skin of overall tubular shape and a plurality of longitudinal stringers of composite material radially protruding from an inner surface of the skin, the method comprising the steps of: a) providing an inner forming mandrel having sectors radially retractable with respect to a central longitudinal axis, the sectors being capable of reaching radially extended positions to define an inner moulding surface providing a plurality of longitudinal slots angularly spaced about the axis; b) placing a main vacuum bag around the inner moulding surface and applying vacuum to make the main vacuum bag adhere to the inner forming surface; c) positioning each of the plurality of stringers of composite material in a respective slot of the plurality of slots; d) placing, in each stringer, a respective inner support having a cross-sectional shape at least partially matching a shape of the stringer, a longitudinal extension corresponding to a longitudinal length of the stringer, and an outer impermeable tubular bag, thus forming coated inner supports; e) applying a composite skin material to form a laminated skin extending 360° around the stringers, the coated inner supports and the inner moulding surface, thus obtaining an uncured barrel including the skin and the stringers; f) closing an outer curing tool around the laminated skin, the outer tool comprising at least two complementary half-molds defining together a cavity providing an outer moulding surface for the fuselage barrel, leaving an annular gap between an outer surface of the skin and the outer moulding surface; g) sealing the main vacuum bag along seal segments which extend along circular edges at two opposite axial ends of the outer tool, except at positions where the stringers are located; h) sealing with continuity, along respective closed loop sealing lines, two opposite open ends of each tubular bag to the complementary half-molds of the outer tool and to the main vacuum bag, wherein each closed loop sealing line comprises a first, radially outer sealing length joined to the outer tool, and a second sealing length joined to the main vacuum bag; i) applying a vacuum to a volume enclosed between the main vacuum bag and the outer tool, thereby widening a diameter of the uncured barrel, causing the uncured barrel to release from the inner mandrel and causing the outer surface of the skin to contact the outer moulding surface of the outer tool; j) radially retracting the sectors of the inner mandrel, removing the outer tool with the barrel from the inner mandrel, and transferring the outer tool containing the uncured barrel in an autoclave for curing the barrel.

2. A method according to claim 1, wherein the annular gap has a dimension of about 2-4 mm.

3. A method according to claim 1, wherein:
the outer tool comprises a union of two of the complementary half-molds: a lower half-mold and an upper half-mold,
each defining one half, respectively an upper half and a lower half of the outer moulding surface; the inner mandrel is rotatable about the central longitudinal axis on a central rotary axle having an outer portion which, during the step e) extends outside the inner mandrel, wherein the outer portion has a length equal or comparable to an axial length of the inner mandrel; and wherein the step f) of closing of the outer curing tool is preceded by the steps of. f1) placing the lower half-mold beneath the inner mandrel on which the uncured barrel is placed; f2) suspending the axle at an intermediate point; f3) placing the lower half-mold under the outer portion of the axle, in line with the central longitudinal axis of the inner mandrel; f4) longitudinally sliding the lower half-mold, with the lower half of the outer moulding surface portion having a concavity facing upwards, bringing the lower half-mold beneath the inner mandrel so as to face the barrel to be cured; f5) laying down from above the upper half-mold, with the upper half of the outer moulding concave surface portion facing downwards, on the lower half-mold.

4. A method according to claim 3, wherein in steps f2)-f4) the axle is suspended from above to allow the lower half-mold to slide under the inner mandrel.

5. A method according to claim 4, wherein the axle is suspended by a hook from a gantry.

6. A method according to claim 1, wherein step d) comprises the step of:
  d1) laying, over the coating inner supports, a ply of uncured pre-impregnated fabric of fiber-reinforced curable thermosetting material.

7. A method according to claim 6, wherein the step d1) is followed by the step of setting up a pre-vacuum bag which is removed before the step e) of laminating the skin.

8. A method according to claim 1, wherein the step d) comprises the step of temporarily supporting opposite ends of the coated inner supports in the stringers by props rotationally integral with the inner mandrel.

9. A method according to claim 1, wherein the step b) of positioning the main vacuum bag on the inner forming surface comprises the steps of:
  inserting, at two opposite axial ends of the inner mandrel two annular inner terminal bags made of nylon,
  sealing the annular inner terminal bags to the inner mandrel along a respective first and second circumferential sealing line, arranged proximate to the two opposite axial ends of the inner mandrel;
  sealing opposite axial ends of the main vacuum bag along a third circumferential sealing line and a fourth circumferential sealing line on outer surfaces of the two annular inner terminal bags, respectively;
  applying over the main vacuum bag a breather fabric and over the breather fabric a tubular separator layer;
  sealing the tubular separator layer to the two annular inner terminal bags along a fifth and a sixth circumferential sealing line.

10. A method according to claim 9, wherein the tubular separator layer is sealed to the two annular inner terminal bags along the fifth and sixth circumferential sealing lines, at outer axial ends of the annular inner terminal bags, in respective positions axially outward with respect to the first and second circumferential sealing lines.

11. A method according to claim 9, wherein the step h) further comprises connecting the main vacuum bag to the outer tool according to the following steps:
  disconnecting the main vacuum bag from the annular inner terminal bags;
  inserting, at the two opposite axial ends of the outer tool, two annular outer terminal bags made of nylon;
  sealing the annular outer terminal bags to the outer tool along a seventh and an eighth circumferential sealing line;
  sealing the opposite axial ends of the main vacuum bag to the two annular outer terminal bags along a respective ninth and tenth circumferential sealing line.

12. A method according to claim 11, wherein in step i) the vacuum is applied through one or more valves connected to the annular outer terminal bags.

13. A method according to claim 9, wherein subsequently to sealing the annular inner terminal bags to the inner mandrel along the first and second circumferential sealing line, the breather fabric is placed around a part of a radially outer surface of the inner mandrel comprised between the first and the lines.

14. A method according to claim 13, wherein the breather fabric covers parts of the annular inner terminal bags.

15. A method according to claim 1, wherein the main vacuum bag has an axial length exceeding an axial length of the inner mandrel.

* * * * *